US008862697B2

(12) United States Patent
He (10) Patent No.: US 8,862,697 B2
(45) Date of Patent: Oct. 14, 2014

(54) INTELLIGENT NETWORK MANAGEMENT PLATFORM FOR IKVM SERVERS

(75) Inventor: Xu He, Richmond (CA)

(73) Assignee: ATEN International Co., Ltd., Shijr (TW)

( * ) Notice: Subject to any disclaimer, the term of this patent is extended or adjusted under 35 U.S.C. 154(b) by 602 days.

(21) Appl. No.: 12/651,429

(22) Filed: Dec. 31, 2009

(65) Prior Publication Data

US 2011/0161405 A1 Jun. 30, 2011

(51) Int. Cl.
*G06F 15/16* (2006.01)
*G06F 15/173* (2006.01)
*H04L 12/24* (2006.01)

(52) U.S. Cl.
CPC .......... *H04L 41/0803* (2013.01); *H04L 41/042* (2013.01)
USPC ............ 709/218; 709/229; 709/238; 709/249

(58) Field of Classification Search
USPC ......... 709/201, 217, 219, 223–225, 227, 238, 709/243, 249, 218, 229, 241
See application file for complete search history.

(56) References Cited

U.S. PATENT DOCUMENTS

| 5,796,736 | A  | * | 8/1998 | Suzuki ........................ 370/254 |
| 6,021,429 | A  | * | 2/2000 | Danknick .................... 709/208 |
| 6,615,272 | B1 | * | 9/2003 | Ambrose ..................... 709/238 |
| 6,757,743 | B1 | * | 6/2004 | Tamori et al. ................ 709/249 |
| 6,857,009 | B1 | * | 2/2005 | Ferreria et al. ............... 709/219 |
| 7,555,567 | B2 | * | 6/2009 | Thomas et al. .............. 709/250 |
| 7,675,921 | B2 | * | 3/2010 | Igarashi ................... 370/395.53 |
| 7,805,526 | B2 | * | 9/2010 | Takabayashi et al. ........ 709/229 |
| 8,130,766 | B2 | * | 3/2012 | Yang ............................ 370/401 |
| 8,422,397 | B2 | * | 4/2013 | Ansari et al. ................. 370/254 |
| 2002/0083342 | A1 | * | 6/2002 | Webb et al. .................... 713/201 |
| 2002/0114286 | A1 | * | 8/2002 | Iwamura et al. .............. 370/252 |
| 2003/0005100 | A1 | * | 1/2003 | Barnard et al. ............... 709/223 |
| 2003/0014462 | A1 |   | 1/2003 | Bennett et al. |
| 2005/0044186 | A1 | * | 2/2005 | Petrisor ......................... 709/219 |
| 2005/0120071 | A1 | * | 6/2005 | Wakamatsu ................... 709/200 |

(Continued)

FOREIGN PATENT DOCUMENTS

| CN | 1655148 | 8/2005 |
| CN | 101361082 | 2/2009 |

OTHER PUBLICATIONS

Chinese Office Action, dated Jan. 18, 2013, in a counterpart Chinese patent application, No. CN 201010624749.5.

(Continued)

*Primary Examiner* — Madhu Woolcock
(74) *Attorney, Agent, or Firm* — Chen Yoshimura LLP (57) ABSTRACT

An IP-based KVM (IKVM) switch system includes a plurality of control centers connected by a network via respective routers. A group of IKVM switches is connected to each router. Each IKVM switch is connected to a plurality of remote computers. Each control center stores system configuration information regarding all other control centers, including their IP addresses, port information, information about the IKVM switches managed by them, and (optionally) the remote computers connected to each IKVM switch. The control centers use a master-slave scheme to share the configuration information among them. When a client logs on to any control center, all IKVM in the system are displayed on a UI so that the client can select any IKVM or (optionally) remote computer for access. The control centers perform necessary functions to facilitate the access to the select IKVM or remote computer by the client.

13 Claims, 8 Drawing Sheets

(56) References Cited

U.S. PATENT DOCUMENTS

| | | |
|---|---|---|
| 2005/0182790 A1 | 8/2005 | Gilbert et al. |
| 2005/0193103 A1* | 9/2005 | Drabik ............................ 709/221 |
| 2006/0031459 A1* | 2/2006 | Ahn et al. ....................... 709/224 |
| 2006/0053212 A1* | 3/2006 | Lin et al. ........................ 709/217 |
| 2006/0092861 A1* | 5/2006 | Corday et al. ................. 370/256 |
| 2006/0112192 A1* | 5/2006 | Stewart et al. ................ 709/249 |
| 2007/0143837 A1 | 6/2007 | Azeez et al. |
| 2007/0288618 A1* | 12/2007 | Yeo et al. ....................... 709/223 |
| 2008/0117922 A1* | 5/2008 | Cockrell et al. ............... 370/401 |
| 2009/0210555 A1* | 8/2009 | Han et al. ....................... 709/238 |
| 2009/0323578 A1* | 12/2009 | Hogenmueller et al. ...... 370/315 |
| 2010/0020753 A1* | 1/2010 | Fulknier et al. ................ 370/329 |
| 2010/0070636 A1* | 3/2010 | Skog et al. ..................... 709/228 |
| 2010/0235502 A1* | 9/2010 | Hutter et al. ................... 709/224 |
| 2011/0090892 A1* | 4/2011 | Cooke ............................ 370/338 |

OTHER PUBLICATIONS

Taiwanese Office Action, dated Oct. 14, 2013, in a counterpart Taiwanese patent application, No. TW 099143713.

* cited by examiner

INTELLIGENT NETWORK MANAGEMENT PLATFORM FOR IKVM SERVERS

BACKGROUND OF THE INVENTION

1. Field of the Invention

This invention relates to the management of a plurality of IP-based devices such as IP-based KVM (IKVM) switches, and in particular, it relates to the management of IP-based devices located on different subnets in a consolidated manner.

2. Description of the Related Art

A KVM (keyboard, video, mouse) switch is a device that connects multiple computers to one or more user consoles. Each user console typically includes a monitor and a set of user input devices such as a keyboard and a mouse. Each user console can selectively communicate with one or more of the computers connected to the KVM switch. An IKVM switch (sometimes referred to as IP-based KVM, or KVM over IP, or more generally, network-based KVM) is a KVM switch that can be accessed via a network such as the Internet, a WAN (wide area network), a LAN (local area network), etc. In an IKVM system, a user console is typically connected to a client computer which is connected to the network. The computers connected to the IKVM switch are referred to as the remote computers as they are located remotely from the client computer.

Figure 1:
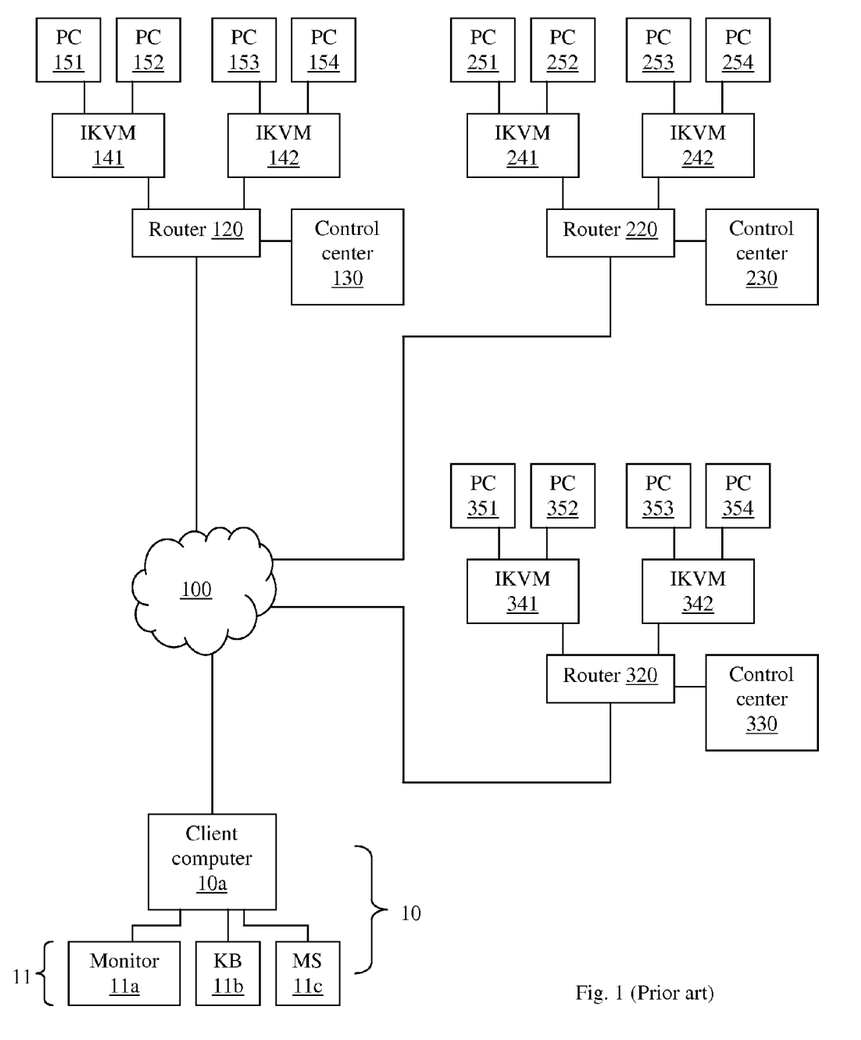
FIG. 1 schematically illustrates a conventional IKVM system.

FIG. 1 schematically illustrates a conventional IKVM system comprising a plurality of IKVM switches. In this system, a plurality of control computers (referred to as control centers in this disclosure) 130, 230, 330 are connected to a network 100 such as the Internet, a WAN, etc., via a plurality of respective routers 120, 220, 320. A group of one or more IKVM switches 141, 142 (or 241, 242, or 341, 342) are connected to each router 120 (or 220, or 320, respectively). Each IKVM switch 141, (or 142, 241, ...) is connected to a plurality of computers (referred to as remote computers) 151, 152 (or 153, 154, 251-254, 351-354). In FIG. 1, to avoid overcrowding, only two IKVM switches are shown for each control center, and only two computers are shown for each IKVM switch. A client 10 is connected to the network 100, and includes a client computer 10a and a user console 11 including a monitor 11a and user input devices such as a keyboard 11b and/or a mouse 11c. In FIG. 1, the control centers 130, 230, etc. and the client 10 are all shown as connected to an open network 100 such as the Internet. Alternatively, the control centers 130, 230, etc. may be connected to a private WAN, while the client 10 accesses one or more of the control centers via the Internet.

Each IKVM switch 141, etc. has a switching function to allow the client 10 to communicate with and control any selected one of the remote computers connected to that IKVM switch. Specifically, the IKVM switch transmits video data from the selected remote computer to the client 10 via the network 100, and transmits keyboard and mouse data received from the client 10 over the network to the selected remote computer.

Each control center 130 (or 230, or 330) manages the respective one or more IKVM switch devices 141, 142 (or 241, 242, or 341, 342, respectively) connected to the corresponding router 120 (or 220, or 320). The assignee of the present invention, Aten International Co., Ltd., manufactured a software product, referred to as "CC1000", which can be installed on the control centers 130 etc. in the conventional IKVM system shown in FIG. 1. The control center 130, etc. running the CC1000 software manages the devices 141, etc. attached to it, including regulating user access to the attached devices (i.e. providing security control), providing a web browser-based user interface to allow access to attached devices over the network, etc. Each IKVM switch devices 141, etc. managed by a control center runs a software program to enable them to cooperate with the control center.

In the system of FIG. 1, the devices that are connected to each router (i.e. a control computer and multiple IKVM switches) form a local network (a subnet), and the respective router connects the subnet to the network 100. In a typical situation, each subnet is a private network and the devices on the subnet cannot be accessed from the outside directly.

In the conventional IKVM system of FIG. 1, the client 10 can only access an IKVM switch (and the remote computer connected to that IKVM switch) by logging on to the control center connected to the same router as the IKVM switch. For example, to access the IKVM switch 141 and the remote computer 151, the client 10 must log on to the control center 130.

SUMMARY OF THE INVENTION

The present invention is directed to an improved IKVM system and related methods.

An object of the present invention is to provide a network structure for an IKVM system including a plurality of control center servers, such that a client computer connected to one control center can access all IKVM switches within the entire system via that control center.

Another object of the present invention is to provide a more reliable and robust network structure for an IKVM system including a plurality of control center servers.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a method implemented on a first control computer for establishing connections between a client and a plurality of network-based devices, the first control computer and the client being connected via a first network, the first control computer being connected to one or more second control computers via a second network, each network based device being associated with either the first control computer or one of the second control computers, the method including: (a) obtaining and storing system configuration information, the system configuration information including, for each of the first and second control computer, address and port information, and identification information of all network-based devices associated with that control computer; (b) communicating with the client using a user interface (UI), wherein the UI displays all network-based devices connected to the first control computer and all second control computers; (c) receiving from the client an input indicating a selected one of the network-based devices; and (d) if the selected network-based device is associated with one of the second control computers, enabling communication between the client and the second control computer.

In the above method, step (d) may include: (d1) transmitting a request to the second control computer, the request identifying the selected network-based device; (d2) receiving data from the second control computer; (d3) transmitting the data received from the second control computer in step (d2) to the client; (d4) receiving data from the client; and (d5) transmitting the data received from the client in step (d4) to the second control computer.

In the above method, step (a) may include: (a1) determining whether the first control computer is a master control computer or a slave control computer; if it is the master control computer, (a2) receiving, from each second control computer, address and port information for that second control computer and identification information of all network-based devices associated with that second control computer, and generating the system configuration information based on the received information; and (a3) transmitting the system configuration to each second control computer; and if it is a slave control computer, (a4) transmitting, to one of the second control computers which acts as a master control computer, address and port information for the first control computer and identification information of all network-based devices associated with the first control computer; and (a5) receiving the system configuration information from the master control computer, and storing the received system configuration information.

In another aspect, the present invention provides a first control computer having a memory storing a computer readable program code, the computer readable program code being configured to cause the control computer to execute the above processes.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 2:
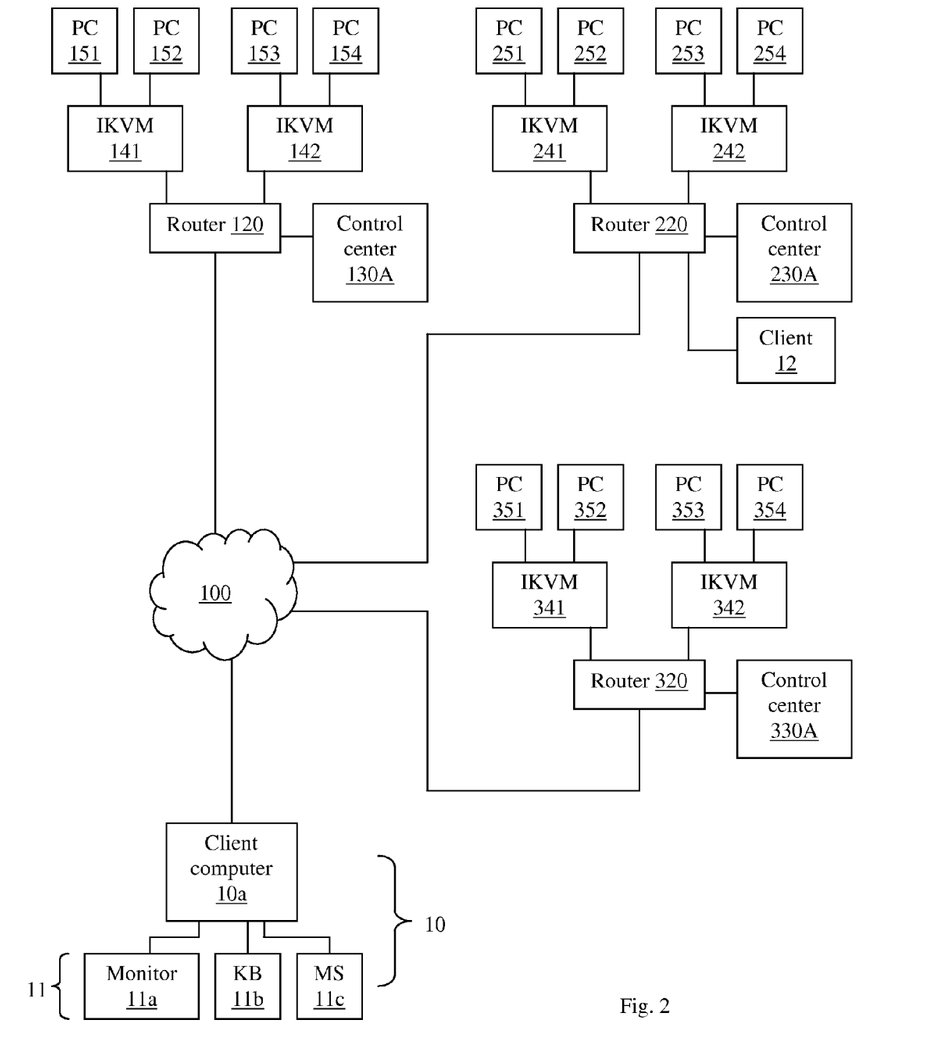
FIG. 2 schematically illustrates an IKVM system in which embodiments of the present invention are implemented.

FIG. 2 schematically illustrates an IKVM system implementing embodiments of the present invention. The IKVM system shown in FIG. 2 has a similar structure as the conventional IKVM switch system shown in FIG. 1 although some components have improved structures as will be described in detail later. In FIGS. 1 and 2, like components are labeled with identical or like symbols.

The following components in the system of FIG. 2 may be identical to, and perform the same functions of, corresponding components in the conventional system of FIG. 1: the computers 151-154, 251-254, and 351-354; the IKVM switches 141, 142, 241, 242, 341, and 342; the routers 120, 220, and 320; the client 10 and the user console 11; and the network 100. Each of the control centers 130A, 230A, and 330A (which replace the control centers 130, 230, 330 of FIG. 1) is a server running control center software according to embodiments of the invention, which is improved over the software running on the control centers 130, 230 and 330 in the conventional system of FIG. 1.

Each control center has a unique server ID, which includes the IP address and port information. Each control center 130A, etc. stores system configuration information regarding all control centers. The system configuration information includes, for each of the other control centers (server), the server's ID (including IP address and port information), as well as information (e.g., device names, device physical IDs, etc.) about the IKVM switches managed by it. The system configuration information also includes information about the IKVM switches directly managed by the control center itself. Optionally, the system configuration information further includes IP address and port information of the IKVM devices managed by other control centers, and information about the remote computers connected to each IKVM switches managed by the other control centers. The system configuration information also includes each server's priority order in a master-slave system as will be described later. Other suitable information may also be included in the system configuration information. The configuration information is exchanged among the control centers automatically in a process of configuring the system, as will be described in more detail later.

Because each control center 130A, etc. stores the system configuration information, it allows a user 10 who logs on to one control center to access any of the IKVM switches managed by any control center, and access any remote computers connected to any IKVM switch in a manner described in more detail later.

Figure 3A:
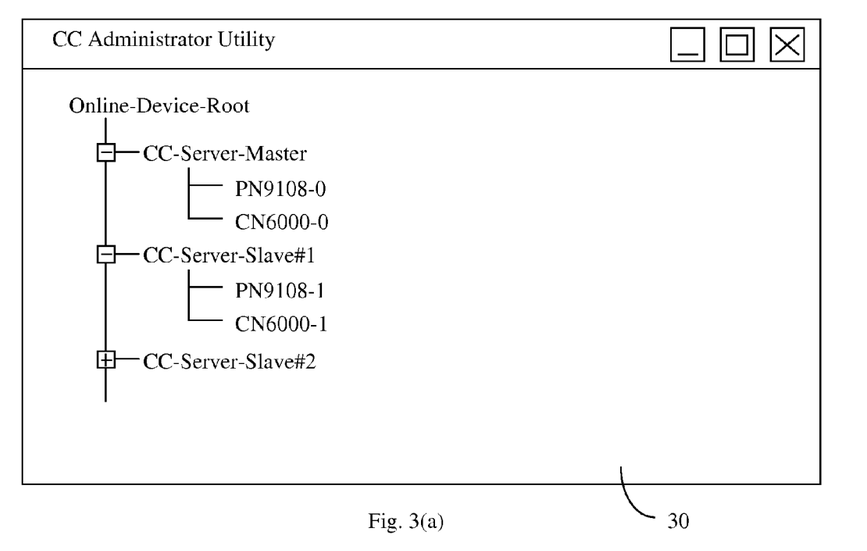
FIGS. 3(a) and 3(b) schematically illustrate exemplary UI windows generated by a control center showing a view of all IKVM switches in the IKVM system.
Figure 3B:
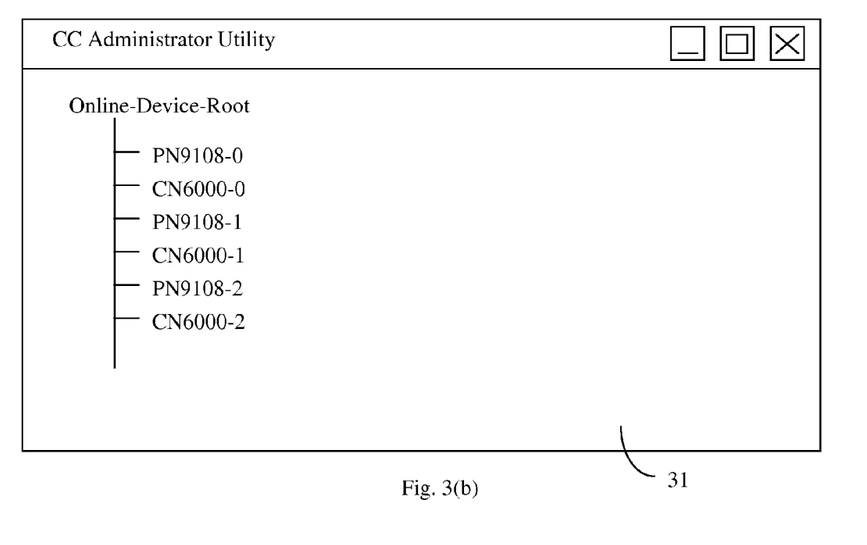

Each control center 130A (or 230A, 330A, 430A) implements a user interface (UI) that displays all of the IKVM switches managed by all of the control centers in the IKVM system to the client 10. FIG. 3(a) illustrates an exemplary UI window 30 generated by a control center. In this example, the UI window 30 displays a tree view showing all control centers on the IKVM system, including CC-Server-Master, CC-Server-Slave#1 and CC-Server-Slave#2 in this example. The UI window 30 further displays the IKVM switch devices managed by each control center. In this example, IKVM switch devices PN9108-0 and CN6000-0 are shown as being managed by the CC-Server-Master, etc. The tree view can be expanded and collapsed as desired by the user. Since all control centers store the same system configuration information, the tree views displayed by the UI of all control centers are the same and include all of the IKVM switches within the system. To access an IKVM switch, the user may simply click on the corresponding item in the UI window 20. In an alternative example shown in FIG. 3(b), the UI window 31 displays all IKVM switches without displaying the control centers. Again, the user may access an IKVM switch by clicking on the item in the UI window 31. In the example of FIG. 3(b), the user does not need to be aware of which control center a particular IKVM switch is managed by.

After the user selects an IKVM switch, the user may interact with that IKVM switch via a user interface of the IKVM switch, and select one of the remote computers connected to the IKVM switch for access. The UI of the IKVM switch may be the same as in a conventional IKVM system. For example, the IKVM switch may implement an on-screen display (OSD) menu or hot keys to allow the user to send commands to the IKVM switch.

In an alternative embodiment, each control center 130A, etc. further stores information about all remote computers connected to each IKVM switch as a part of the system configuration information for the other control centers. Thus, the UI of the control center 30 and 31 can further display the list of remote computers connected to each IKVM switch. A collapsible tree structure may be used for this display. Using this UI, the user can select a remote computer connected to an IKVM switch by clicking on the corresponding item representing the remote computer. Thus, the user can directly select a remote computer without using the UI of the IKVM switch.

In addition to a client 10 on the network 100, a client connected to one of the routers may also access a remote computer anywhere within the IKVM system. For example, as illustrated in FIG. 2, a client 12 (which includes a client computer and a user console) is connected to the router 220. The client 12 can log on to the control center 230A on the same router, selects an IKVM switch (e.g. 141) connected to another control center, and selects a remote computer (e.g. 151) connected that IKVM switch. If the client 12 is connected to the network 100 via the router 220, the client may also directly log on to another control center (e.g. control center 330A) via the network 100.

Figure 4:
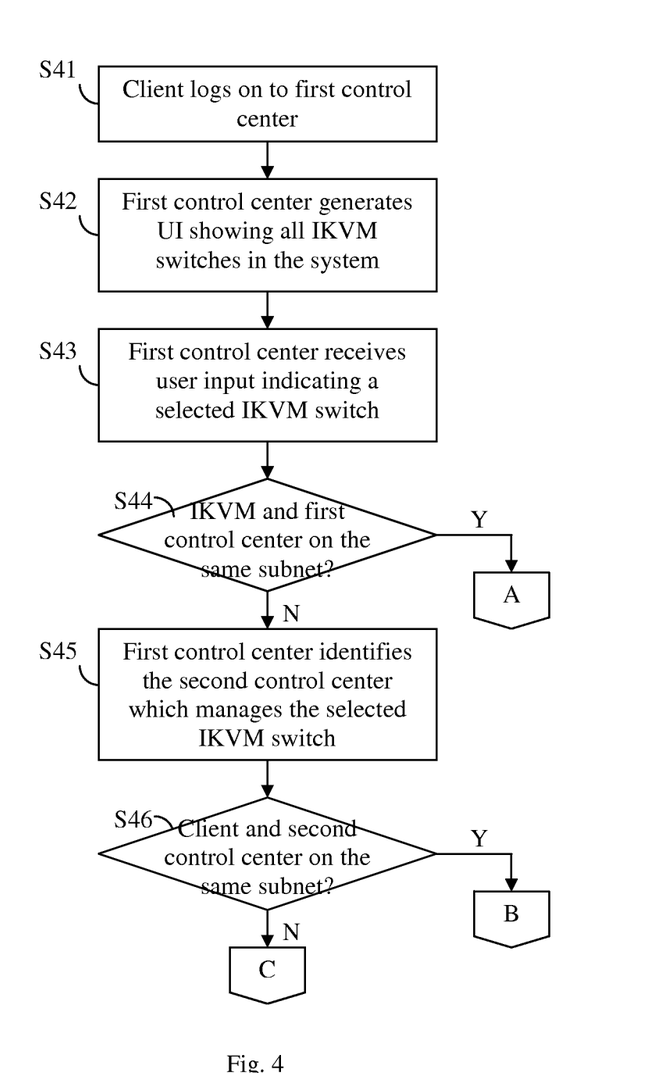
FIGS. 4-4C schematically illustrate a process for allowing a client to select and communicate with a desired IKVM switch.

To enable the client 10 to access any of the IKVM switches by logging on to a single control center, the control centers 130A etc. perform a process described below with reference to FIGS. 4-4C. First, the user (client 10) logs on to a first control center chosen by the user (130A in this example) (step S41). The first control center 130A displays a UI on the client's console, such as that shown in FIG. 6(a) or FIG. 6(b), which lists all IKVM switches in the IKVM system (step S42). The user selects a desired IKVM switch using the UI, e.g., by clicking an item representing an IKVM switch. The first control center 130A receives the input from the user indicating the selection (step S43), and determines whether the selected IKVM switch is located on the same subnet as the first control center (step S44). This determination is based on the system configuration information previously stored in the control server 130A.

If the selected IKVM switch is located on the same subnet as the first control center ("Y" in step S44) (in this example, the selected IKVM switch is 141), the first control center 130A performs control (managing) functions with respect to the selected IKVM switch 141. In this situation, data is transferred between the selected IKVM switch 141 and the client 10 via the first control center 130A. Specifically (see FIG. 4A), the first control center performs managing functions with respect to the selected IKVM switch 141 (step S401), such as logging the client on to the IKVM switch, performing security check, etc. These managing functions are generally the same as those performed by the control centers in the conventional system of FIG. 1. Data from the IKVM switch 141 is transmitted to the first control center 130A (step S402), and the first control center transmits the data to the client 10 (step S403). The client 10 transmits date for the IKVM switch 141 to the first control center 130A (step S404), and the first control center 130A transmits the data to the selected IKVM switch 141 (step S405). The steps S401 to S405 are repeated as appropriate while the client 10 continues to communicate with the IKVM switch 141.

Referring again to FIG. 4, in step S44, if the selected IKVM switch is not located on the same subnet as the first control center ("N" in step S44) (in this example, the selected IKVM switch is 241), the first control center 130A identifies the second control center that manages the selected IKVM switch (step S45). In this example, the selected IKVM switch 241 is managed by control center 230A. The first control center 130A then determines whether the second control center 230A is on the same subnet as the client 10 (step S46). The determinations in steps S45 and S46 are based on the system configuration information previously stored in the control server 130A.

If the second control center 230A is on the same subnet as the client ("Y" in step S46), then it means that the second control center 230A and the client can achieve network communication directly. This situation will occur, for example, if the client is the client 12 shown in FIG. 2. In such a case (see FIG. 4B), the first control center 130A transmits a request to the second control center 230A (step S411), where the request contains the client's IP address and the identity of the selected IKVM switch. Thereafter, the second control center performs control (managing) functions with respect to the selected IKVM switch 241, and establishes network communication with the client directly using appropriate network communication protocols. This establishment of this communication occurs automatically without the intervention of the human user at the client 10. Data is transferred between the selected IKVM switch 241 and the client 12 via the second control center 230A without going through the first control center 130A. Specifically, the second control center performs managing functions with respect to the IKVM switch 241 (step S412). Data from the IKVM switch 241 is transmitted to the second control center 230A (step S413), which further transmits the data to the client (step S414). The client 12 transmits date for the IKVM switch 241 to the second control center 230A (step S415), and the second control center 230A transmits the data to the selected IKVM switch 241 (step S416). The steps S412 to S416 are repeated as appropriate while the client 12 continues to communicate with the IKVM switch 241.

Referring again to FIG. 4, in step S46, if the second control center 230A is not on the same subnet as the client ("N" in step S46), for example, when the client is client 10 located on the internet, then the second control center performs control (managing) functions with respect to the selected IKVM switch 241, but data is transferred between the selected IKVM switch 241 and the client 10 via the first control center 130A and the second control center 230A. Specifically, the first control center 130A transmits a request to the second control center 230A (step S421). The request contains the identity of the selected IKVM switch. The second control center performs managing functions with respect to the selected IKVM 241 (step S422). Data from the IKVM switch 241 is transmitted to the second control center 230A (step S423). The second control center 230A transmits the data to the first control center 130A (step S424), which in turn transmits the data to the client 10 (step S245). The client 10 transmits data to the first control center 130A (step S246), which transmits it to the second control center 230A (step S247). The second control center 230A transmits the data to the selected IKVM switch 241 (step S248). The steps S421 to S428 are repeated as appropriate while the client 10 continues to communicate with the IKVM switch 241.

Figure 4A:
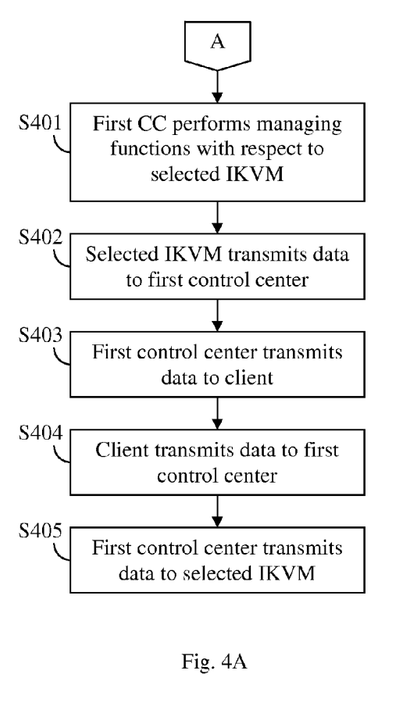
Figure 4B:
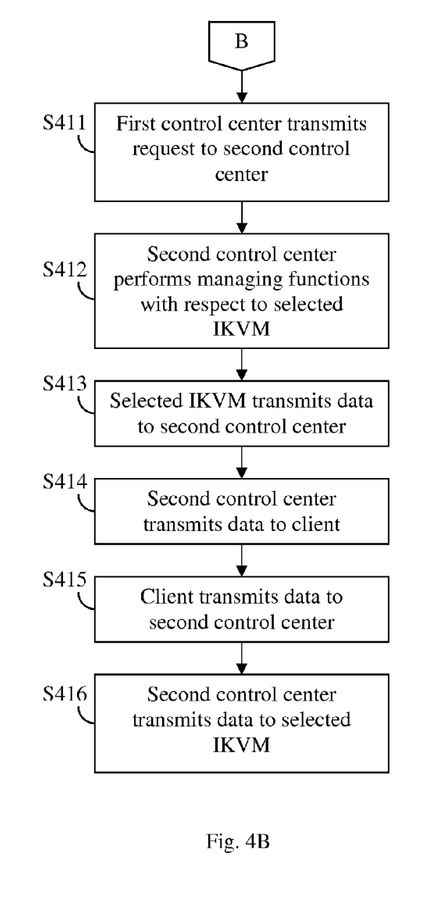
Figure 4C:
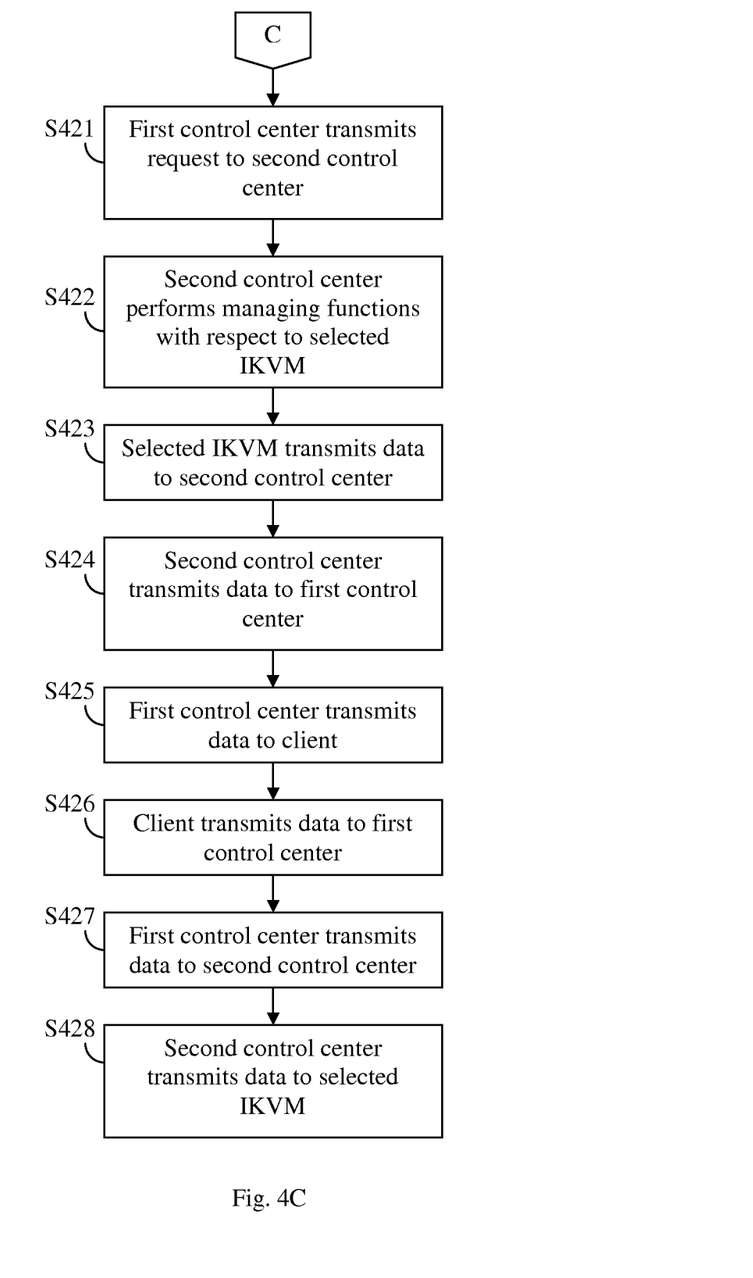

During the processes shown in FIGS. 4A-4C, the selected IKVM switch performs appropriate KVM switching functions including, for example, communicating with the client using an OSD (on-screen display) menu, switching one of the remote computers (e.g., 251, 252, etc.) to be connected with the client, etc. As is well known in the field of KVM switches, once a remote computer is connected to a client (user console) via a KVM or IKVM switch, the remote computer and the client interact with each other to exchange video image and keyboard/mouse data and other data as if the client is directly connected to the remote computer. In the processes described above, the data exchanged between the remote computer and the client goes through, in addition to the IKVM switch, the first control center or the second control center or both.

As mentioned earlier, each control center 130A, etc. may further stores IP address and port information of all IKVM switches managed by other control centers. Thus, if the first control center 130A determines that an IKVM switch selected by the client can directly communicate with the client, the first control center may request the selected IKVM switch to directly communicate with the client.

As mentioned earlier, the user may directly select a remote computer from the UI of the first control center. In such an alternative embodiment, the process shown described above is modified as follows. In step S42, the UI of the first control center further displays a list of remote computers connected to each IKVM switch. In step S43, the user selects a desired remote computer using the UI of the first control center (this also impliedly selects an IKVM switch). In step S411 and S421, the request further identifies the selected remote computer. In this alternative embodiment, the selected IKVM switch can switch the selected remote computer to the client 10 without having to display an OSD menu to the user.

Figure 5A:
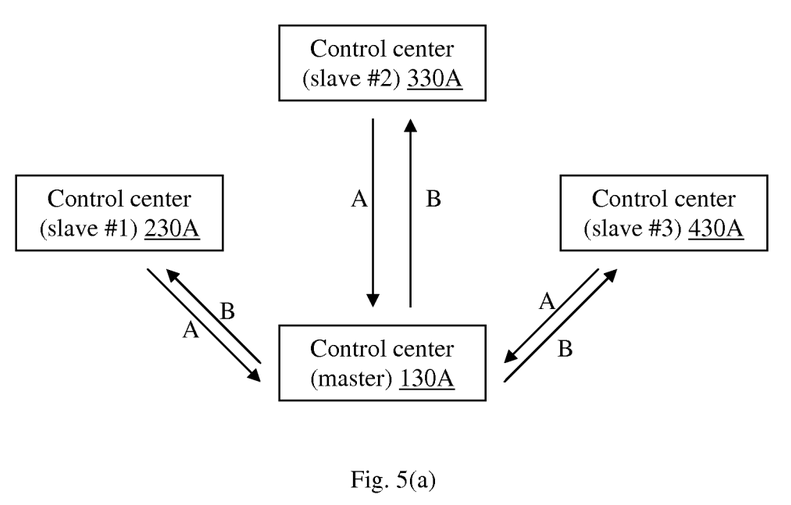
FIG. 5(a) schematically illustrates a master-slave structure of a plurality of control centers connected by a network.

As mentioned earlier, each control center 130A, etc. stores the system configuration information of the entire system. The configuration information is exchanged among the control centers automatically. To facilitate the sharing of information and management, the plurality of control centers 130A etc. are arranged into master-slave system. FIG. 5(a) illustrates a network where the control center 130A acts as a master and the control centers 230A, 330A and 430A act as slaves. These control centers are connected to each other by the network (not shown) via respective routers (not shown). As shown in FIG. 5(a), the slave control centers 230A, 330A, 430A transmit their respective configuration information (IP address, port information, IKVM switches managed by it, etc.) to the master control center 130A, as indicated by arrows A. The mater control center 130A then transmits the configuration information of all control centers (collectively, the system configuration information) to all slave control centers, as indicated by arrows B. Any update of the configuration information is also transmitted from the relevant control center to the master control center and broadcast by the master control center to all slave control centers. As a result, the configuration information is provided to all control centers in a synchronized manner.

Figure 5B:
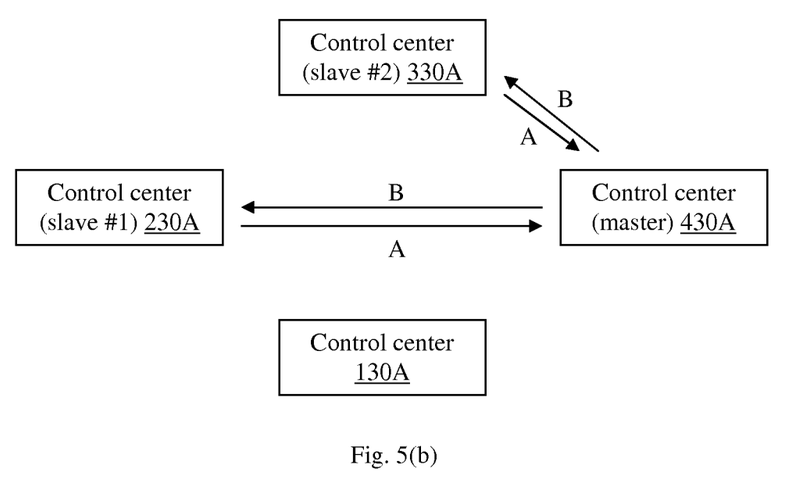
FIG. 5(b) schematically illustrates a master-slave structure of the plurality of control centers where a previous slave substitutes as a master.

The master-slave structure of the network of control centers can be automatically re-configured if the master control center 130A fails. In such a situation, one of the slave control centers will act as a master control center. A priority order, which determines the order in which the control centers will substitute as the master, is pre-defined and stored in all control centers as a part of the configuration information. For example, the priority order of the slaves may be assigned by the master when the slaves initially report their configuration information to the master. The priority order may be based on the timing order in which the multiple slaves reported to the master. FIG. 5(b) illustrates an example where the system is re-configured so the control center 430A (previously slave #3) now acts as a master, with control center 130A having failed (non-operational, disconnected, etc.). The arrows "A" represent the configuration information transmitted by other slave control centers to the new master 430A, and arrows "B" represent the configuration information broadcast from new master to all slaves.

Figure 6:
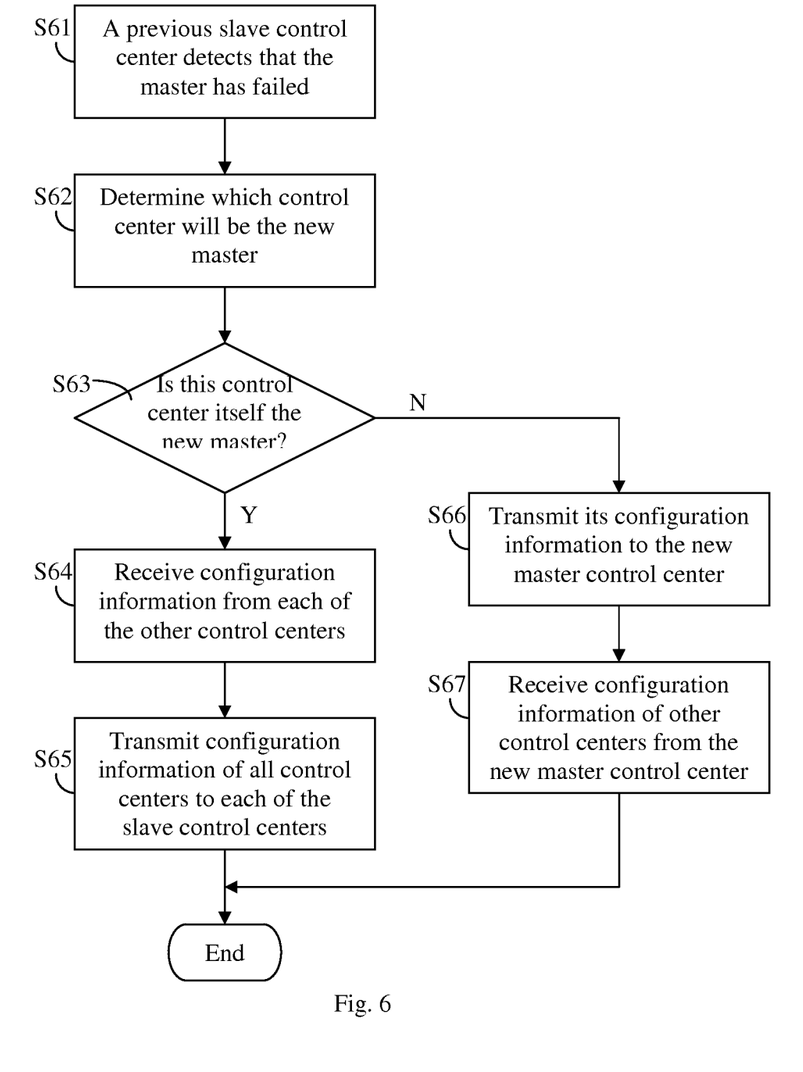
FIG. 6 schematically illustrates a process for re-configuring the master-slave structure of the plurality of control centers.

A process executed by each control center (previous a slave) during re-configuration of the master-slave structure is described with reference to FIG. 6. When a previous slave control center detects that the master control center has failed (for example, the previous slave control center detects that a connection with the master is disconnected or cannot be established) (step S61), the previous slave determines which control center will be the next master based on the priority order previously stored in the control center as a part of the configuration information (step S62). If the control center itself is the new master ("Y" in step S63), it receives the configuration information from each of the other control centers (step S64), and then transmits (e.g. by broadcasting) the configuration information of all control centers to all of the other control centers (step S65). If the control center itself is not the new master ("N" in step S63), it transmits its own configuration information to the new master (step S66), and receives the configuration information of all other control centers from the new master (step S67).

In the mean time, each control center continues to detect whether the previous master has recovered. If the previous master recovered, the system will be re-configured so that the previous master will become the master again. In such a case, the recovered master will perform steps S64 and S65, and the slave control center will perform steps S66 and S67 with respect to the recovered master.

In the schematic illustration of FIG. 2, each IKVM switch 141, etc. is shown as being managed by one control center 130A, etc. In a further embodiment, redundancy is built into the IKVM system so that each IKVM switch can be managed by two alternative control centers. Each IKVM switch stores the IP addresses of two control centers. For example, IKVM switches 241 and 242 stores the IP addresses of both the control center 230A and the control center 330A. Normally, each IKVM switch associates itself with one control center (the primary control center, which is typically the control center that is on the same subnet as the IKVM switch) and is managed by it. However, if the primary control center fails, the IKVM switch automatically re-associate itself with the alternative control center. In this re-association process, the IKVM communicates with the alternative control center and provides the alternative control center with necessary information such as its IP address. The alternative control center stores such information. To implement this further embodiment, modified software or firmware is provided on the IKVM switches 141, etc.

To summarize, the control centers 130A, etc. perform several functions. First, each control center manages the IKVM switches associated with it at the request of a client logged on to the control center. This function is generally the same as the function performed by the conventional control centers 130 etc. shown in FIG. 1. Second, each control center allows a client logged on to the control center to access IKVM switches managed by other control centers. In this sense, the control center can be viewed as performing a reverse proxy function. Third, each control center, at the request of another control center, manages IKVM switches associated with it and transfers data between the IKVM switch and the other control center.

To accomplish the second function, each control center performs several specific tasks. First, the control centers exchange configuration information with each other, and each control center stores configuration information of all other control centers. A master-slave scheme is implemented to facilitate the exchange of configuration information among the control centers. Second, the control center interacts with the client via a UI, which displays all IKVM switches within the system and allows the client to select a desired IKVM switch to access. Third, once an IKVM switch is selected, the control center communicates with another control center (the one that manages the selected IKVM switch) and passes data between the client and the other control center.

The above-described functions of the control centers are implemented by software or firmware (computer readable program code) stored in a memory the control centers and executed by a CPU of the control center.

The IKVM system shown and described above provides many advantages. The client 10 or 12 only needs to log on to one control center initially, and can then access other control centers, IKVM switches, and remote computers using the UI of the control center it is logged on to. In other words, the client only needs to possess the IP address of one functioning control center in order to access any device within the entire system. The UI provides a convenient way for the user to select an IKVM or a remote computer to interact with. The connection between the client 10 and the selected IKVM or remote computer is automatically established and transparent to the user. The system is redundant and can be re-configured automatically.

In the above descriptions, IKVM switches are used as an example of IP-based devices. The term "IP-based devices", or more generally, "network-based devices", refers to devices that have a network interface and can be accessed over a network. Other terms have been used for such devices, such as "over IP devices", etc. Other example of IP-based devices includes servers, power source or control devices, environmental monitor devices for monitoring a computer room's environment, etc. The system described above can be used to manage any such IP-based devices.

It will be apparent to those skilled in the art that various modification and variations can be made in the IKVM system and related method of the present invention without departing from the spirit or scope of the invention. Thus, it is intended that the present invention cover modifications and variations that come within the scope of the appended claims and their equivalents.

What is claimed is:

1. A method for establishing connections between a client and a plurality of IP-based switching devices, the method comprising:
 (a) obtaining and storing system configuration information on each of a first control computer and one or more second control computers, the system configuration information including, for each of the first control computer and the one or more second control computers connected to the first control computer over a communication network, address and port information, and identification information of all of the plurality of IP-based switching devices managed by each respective control computer, wherein each of the plurality of IP-based switching devices are connected to either the first control computer or one of the one or more second control computers, each IP-based switching device connecting multiple computers to one or more user consoles, wherein each control computer and its managed IP-based switching devices form a sub-network connected to the communication network via a router;
 (b) in response to a user of the client choosing and logging on to the first control computer to access an IP-based switching device, the first control computer communicating with the client using a user interface (UI), wherein the UI displays all of the plurality of IP-based switching devices;
 (c) receiving, by the first control computer from the client, an input indicating a selected one of the displayed IP-based switching devices;
 (c1) determining, by the first control computer, whether the selected IP-based switching device and the first control computer are on a same sub-network;
 (c2) if the selected IP-based switching device and the first control computer are determined to be on the same sub-network, then the first control computer enabling communication between the client and the selected IP-based switching device via the first control computer, wherein enabling communication includes performing managing functions by transmitting data between the client and the selected IP-based switching device;
 (c3) if the selected IP-based switching device and the first control computer are determined to not be on the same sub-network, then the first control computer identifying one of the one or more second control computers that manages the selected IP-based switching device; and
 (d) determining, by the first control computer, whether the client and the identified one of the one or more second control computers are on a same sub-network based on the system configuration information stored on the first control computer;
 (d1) if the client and the identified one of the one or more second control computers are determined to not be on the a same sub-network, then enabling communication between the client and the selected IP-based switching device via the first control computer and the identified one of the one or more second control computers, wherein enabling communication comprises the first control computer transmitting a request containing an identity of the selected IP-based switching device to the identified one of the one or more second control computers, the identified one of the one or more second control computers performing managing functions with respect to the selected IP-based switching device, and wherein data communicated between the client and the selected IP-based switching device is communicated via the first control computer and the identified one of the one or more second control computers;
 (d2) if the client and the identified one of the one or more second control computers are determined to be on the a same sub-network, then enabling direct communication between the client and the identified one of the one or more second control computers, wherein enabling direct communication comprises the first control computer transmitting a request to the identified one of the one or more second control computers identifying the client's IP address and an identity of the selected IP-based switching device, the identified one of the one or more second control computers performing managing functions with respect to the selected IP-based switching device and based on automatically established network communication directly between the client and the identified one of the one or more second control computers, thereafter transferring data between the selected IP-based switching device and the client via the identified one of the one or more second control computers without going through the first control computer.

2. The method of claim 1, where step (d2) further comprises:
transmitting the request to the identified one of the one or more second control computers;
receiving data from the identified one of the one or more second control computers;
transmitting the data received from the identified one of the one or more second control computers in step (d2-2) to the client;
receiving data from the client; and
transmitting the data received from the client in step (d2-4) to the identified one of the one or more second control computers.

3. The method of claim 1, wherein step (d2) comprises:
the request further requesting the identified one of the one or more second control computers to directly communicate with the client.

4. The method of claim 1, further comprising:
receiving a request from another of the one or more second control computers, the request from the another of the one or more second control computers identifying a selected IP-based switching device managed by the first control computer;
communicating with the selected IP-based switching device managed by the first control computer; and
transmitting data between the selected IP-based switching device managed by the first control computer and the another of the one or more second control computers.

5. The method of claim 1, wherein step (a) comprises:
(a1) determining whether the first control computer is a master control computer or a slave control computer;
if the first control computer is determined to be the master control computer,
(a2) receiving, from each second control computer, address and port information for that second control computer and identification information of all IP-based switching devices managed by that second control computer, and generating the system configuration information based on the received information; and
(a3) transmitting the system configuration to each second control computer; and
if the first control computer is determined to be a slave control computer,
(a4) transmitting, to a second control computers of the one or more second control computers which acts as a master control computer, address and port information for the first control computer and identification information of all IP-based switching devices managed by the first control computer; and
(a5) receiving the system configuration information from the master control computer, and storing the received system configuration information.

6. The method of claim 5, wherein step (a) further comprises:
(a6) if the first control computer is a slave control computer, detecting whether the master control computer has failed;
(a7) if the master control computer has failed, determining whether the first control computer is a new master control computer;
(a8) if the first control computer is the new master control computer, repeating steps (a2) and (a3); and
(a9) if the first control computer is not the new master control computer, repeating steps (a4) and (a5).

7. The method of claim 1, wherein the communication network is the Internet or a WAN (wide area network), and wherein the address information is an IP address.

8. The method of claim 1, wherein the IP-based switching devices are IP-based KVM (keyboard, video, mouse) switches each connected to a plurality of remote computers.

9. A first control computer having a memory storing a computer readable program code, the computer readable program code being configured to cause the first control computer to execute a process for establishing connections between a client and a plurality of IP-based switching devices, wherein the process comprises:
(a) obtaining and storing system configuration information on each of the first control computer and one or more second control computers, the system configuration information including, for each of the first control computer and the one or more second control computers connected to the first control computer over a communication network, address and port information, and identification information of all of the plurality of IP-based switching devices managed by each respective control computer, wherein each of the plurality of IP-based switching devices are connected to either the first control computer or one of the one or more second control computers, each IP-based switching device connecting multiple computers to one or more user consoles, wherein each control computer and its managed IP-based switching devices form a sub-network connected to the communication network via a router;
(b) in response to a user of the client choosing and logging on to the first control computer to access an IP-based switching device, the first control computer communicating with the client using a user interface (UI), wherein the UI displays all of the plurality of IP-based switching devices;
(c) receiving, by the first control computer from the client, an input indicating a selected one of the displayed IP-based switching devices;
(c1) determining, by the first control computer, whether the selected IP-based switching device and the first control computer are on a same sub-network;
(c2) if the selected IP-based switching device and the first control computer are determined to be on the same sub-network, then the first control computer enabling communication between the client and the selected IP-based switching device via the first control computer, wherein enabling communication includes performing managing functions by transmitting data between the client and the selected IP-based switching device;
(c3) if the selected IP-based switching device and the first control computer are determined to not be on the same sub-network, then the first control computer identifying one of the one or more second control computers that manages the selected IP-based switching device; and
(d) determining, by the first control computer, whether the client and the identified one of the one or more second control computers are on a same sub-network based on the system configuration information stored on the first control computer;
(d1) if the client and the identified one of the one or more second control computers are determined to not be on the same sub-network, then enabling communication between the client and the selected IP-based switching device via the first control computer and the identified one of the one or more second control computers, wherein enabling communication comprises the first control computer transmitting a request containing an identity of the selected IP-based switching device to the identified one of the one or more second control computers, the identified one of the one or more second control computers performing managing functions with respect to the selected IP-based switching device, and wherein data communicated between the client and the selected IP-based switching device is communicated via the first control computer and the identified one of the one or more second control computers;

(d2) if the client and the identified one of the one or more second control computers are determined to be on the same sub-network, then enabling direct communication between the client and the identified one of the one or more second control computers, wherein enabling direct communication comprises the first control computer transmitting a request to the identified one of the one or more second control computers identifying the client's IP address and an identity of the selected IP-based switching device, the identified one of the one or more second control computers performing managing functions with respect to the selected IP-based switching device and based on automatically established network communication directly between the client and the identified one of the one or more second control computers, thereafter transferring data between the selected IP-based switching device and the client via the identified one of the one or more second control computers without going through the first control computer.

10. The first control computer of claim 9, where step (d2) further comprises:
transmitting the request to the identified one of the one or more second control computers;
receiving data from the identified one of the one or more second control computers;
transmitting the data received from the identified one of the one or more second control computers in step (d2-2) to the client;
receiving data from the client; and
transmitting the data received from the client in step (d2-4) to the identified one of the one or more second control computers.

11. The first control computer of claim 9, wherein the process further comprises:
receiving a request from another of the one or more second control computers, the request from the another of the one or more second control computers identifying a selected IP-based switching device managed by the first control computer;
communicating with the selected IP-based switching device managed by the first control computer; and
transmitting data between the selected IP-based switching device managed by the first control computer and the another of the one or more second control computers.

12. The first control computer of claim 9, wherein step (a) comprises:
(a1) determining whether the first control computer is a master control computer or a slave control computer;
if the first control computer is determined to be the master control computer,
(a2) receiving, from each second control computer, address and port information for that second control computer and identification information of all IP-based switching devices managed by that second control computer, and generating the system configuration information based on the received information; and
(a3) transmitting the system configuration to each second control computer; and
if the first control computer is determined to be a slave control computer,
(a4) transmitting, to a second control computers of the one or more second control computers which acts as a master control computer, address and port information for the first control computer and identification information of all IP-based switching devices managed by the first control computer; and
(a5) receiving the system configuration information from the master control computer, and storing the received system configuration information.

13. The first control computer of claim 12, wherein step (a) further comprises:
(a6) if the first control computer is a slave control computer, detecting whether the master control computer has failed;
(a7) if the master control computer has failed, determining whether the first control computer is a new master control computer;
(a8) if the first control computer is the new master control computer, repeating steps (a2) and (a3); and
(a9) if the first control computer is not the new master control computer, repeating steps (a4) and (a5).

* * * * *